United States Patent [19]

Harper

[11] Patent Number: 5,209,326
[45] Date of Patent: May 11, 1993

[54] ACTIVE VIBRATION CONTROL

[75] Inventor: Mark F. L. Harper, Cambridge, England

[73] Assignee: Active Noise and Vibration Technologies Inc., Phoenix, Ariz.

[21] Appl. No.: 758,612

[22] Filed: Sep. 12, 1991

Related U.S. Application Data

[63] Continuation-in-part of Ser. No. 492,819, Mar. 13, 1990, abandoned.

[30] Foreign Application Priority Data

Mar. 16, 1989 [GB] United Kingdom ............... 8906069

[51] Int. Cl.$^5$ .................................................. F16F 7/10
[52] U.S. Cl. .................................. 188/378; 267/136; 248/550
[58] Field of Search ............... 188/378, 379, 380, 267, 188/1.11, 382; 267/136; 248/550, 638, 636, 562; 73/663, 668; 244/119; 364/508

[56] References Cited

U.S. PATENT DOCUMENTS

| | | | |
|---|---|---|---|
| 2,361,071 | 10/1944 | Vang | 244/119 X |
| 2,964,272 | 12/1960 | Olson | 188/1.11 X |
| 3,464,657 | 9/1969 | Bullard | 248/550 |
| 3,703,999 | 11/1972 | Forys et al. | 248/638 X |
| 3,952,979 | 4/1976 | Hansen | 248/638 X |
| 3,991,959 | 11/1976 | Albus | 188/378 X |
| 4,033,541 | 7/1977 | Malueg | 248/550 |
| 4,083,433 | 4/1978 | Geohegan, Jr. et al. | 188/382 |
| 4,336,917 | 6/1982 | Phillips | 248/550 |
| 4,436,188 | 3/1984 | Jones | 188/378 |
| 4,511,114 | 4/1985 | Cawley | 188/1.11 X |
| 4,593,501 | 6/1986 | Delfosse | 248/638 X |
| 4,643,385 | 2/1987 | Sandercock | 248/550 |
| 4,795,123 | 1/1989 | Forward et al. | 248/550 |
| 4,821,205 | 4/1989 | Schutter et al. | 248/550 X |
| 4,852,848 | 8/1989 | Kucera | 188/379 X |
| 4,950,966 | 8/1990 | Moulds | 267/136 X |
| 5,012,428 | 4/1991 | Ueno et al. | 364/508 |
| 5,022,628 | 6/1991 | Johnson et al. | 248/550 X |
| 5,052,510 | 10/1991 | Gossman | 248/550 X |

FOREIGN PATENT DOCUMENTS

| | | | |
|---|---|---|---|
| 0348087 | 12/1989 | European Pat. Off. | 248/638 |
| 2550608 | 2/1985 | France | 267/136 |
| 0005486 | 1/1983 | Japan | 188/378 |
| 0190538 | 10/1984 | Japan | 188/378 |
| 0571642 | 9/1977 | U.S.S.R. | 188/378 |
| 1260457 | 1/1972 | United Kingdom. | |
| 1387031 | 3/1975 | United Kingdom. | |
| 2229511 | 9/1990 | United Kingdom. | |

OTHER PUBLICATIONS

Elliot, et al, "A Multiple Error LMS Algorithm ... Sound and Vibration", IEE Transactions on Acoustics, Speech and Signal Processing, vol. ASSP-35, No. 10, Oct. 1987, pp. 1423-1434.

Mace, "Active Control of Flexural Vibrations", Journal of Sound and Vibration, vol. 114, No. 2, pp. 253-270, 1987.

Schaechter, et al, "Experimental Demonstration of the Control of Flexible Structures", J. Guidance, vol. 7, No. 5, Sep.-Oct. 1984, pp. 527-534.

Primary Examiner—Douglas C. Butler
Attorney, Agent, or Firm—Lee, Mann, Smith, McWilliams, Sweeney & Ohlson

[57] ABSTRACT

A method of and a system for active vibration control of an extended mechanical structure having a point or region at which unwanted vibrations are to be reduced or suppressed, wherein a plurality of uni-axial inertial actuators (4, 5) are disposed to act on a rigid intermediate part such as a flange (1) attached to the point or region of the structure. The actuators may be controlled by an electronic controller (35, FIG. 3) to which are fed control signals from accelerometer sensors (27, 28) adjacent the flange (11).

5 Claims, 3 Drawing Sheets

ACTIVE VIBRATION CONTROL

FIELD OF THE INVENTION

This application is a continuation-in-part of U.S. Ser. No. 492819 filed on March 13th, 1990 now abandoned.

This invention relates generally to the active control of vibration.

BACKGROUND TO THE INVENTION

There are many instances in which unwanted mechanical vibrations propagate through an extended structure or assembly of structures or bodies in mechanical communication. One example is the transmission of vibrations from a spacecraft or satellite to antennae or other sensitive equipment or apparatus mounted from it at the end of a thin boom. Typically the boom will not be mechanically damped and the vibrations will be communicated along it to the antenna equipment or apparatus and so interfere with its normal functions.

Another example is the transmission of unwanted vibration from heavy machinery such as ship engines via pipes, mounts or other members connecting it to the supporting structure.

In U.S. Pat. No. 4436188 to Jones there is disclosed a controlled motion apparatus including three actuators disposed respectively along three orthogonal axes. However, in contrast to the present invention, the Jones apparatus is intended either to induce vibration simulation for the testing of equipment, or alternatively to produce the required movements for a machine tool such as a profile cutter.

Various publications deal with the cancellation of specific modes of vibrations by point-acting actuators. Examples are the article by Schaechter et al in the Journal "Guidance" I(5), 1984, at pages 527 to 534 and the article by Mace in the Journal "Sound and Vibration" 114(2), 1987 at pages 253 to 270. In copending U.S. patent application No. 07/492817, filed Mar. 13, 1990, now abandoned and replaced by co-pending U.S. patent application Ser. No. 07/809,704, filed Dec. 17, 1991 (corresponding to British published patent specification No. 2229789) a method is disclosed whereby mechanical vibrations of any type may be prevented from propagating along a beam, pipe or other extended part of a mechanical structure.

It is an object of this invention to provide a method of and a system for active vibration control whereby vibrational displacements at a chosen point or region of an extended mechanical structure may be at least reduced, as desired, or even caused to disappear altogether.

SUMMARY OF THE INVENTION

A system of active vibration control in accordance with the invention consists of a plurality of uni-axial inertial actuators as herein defined which are disposed so as to exert forces on a region of an extended mechanical structure.

By the term "uni-axial inertial actuator", as used herein, is meant an actuator which is both uni-axial and inertial. By an "actuator" is meant a device which produces an action in response to a control signal. By the term "uni-axial actuator" is meant an actuator which is capable of producing an action in only a single direction. The action in this case will be a force applied in the direction of action. By the term "inertial actuator" is meant an actuator which produces a force by virtue of the inertial reaction of a mass which is caused to accelerate in a direction opposite to the direction of the force produced.

Reference will be made to the Euclidian line passing through the point at which the action is produced and parallel to the direction of action, and this line will be termed the "axis of action". Examples of suitable actuator devices are electrodynamic or hydraulic actuators backed by an inertial mass.

The desired effect may conveniently be produced by supporting the inertial actuators from an intermediate rigid body such as a flange or plate which may then be rigidly attached to the said point or region. In order to effect control over many degrees of freedom of vibration, i.e. control over translation in up to three independent directions and also over rotation about up to three independent axes, of the point to be controlled, then more than one uni-axial inertial actuator must be caused to act upon the intermediate body. The axes of action of the actuators must be so disposed as to allow them to exert upon the intermediate body the torques and linear forces which it is desired to exert at the point to be controlled in order to control two or more degrees of freedom of vibratory motion. The intermediate body may then be rigidly attached to that point in order to apply the control. If a minimum of six uni-axial inertial actuators are caused to act on the intermediate body along suitably disposed axes of action, then control may be applied to all six degrees of freedom of motion of the point to be controlled. If a lesser number of degrees of freedom have to be controlled, then a lesser number of uni-axial inertial actuators may be sufficient.

In the special case that the chosen point or region is contained within or is equivalent to a part of the structure which is substantially rigid and of suitable extent, then the intermediate body may be dispensed with and the uni-axial actuators may be attached directly to the rigid part of the structure which then acts as the rigid intermediate body.

An actuator constructed in accordance with the above description is preferably used in conjunction with sensors providing information relating directly or indirectly to the vibration at the point at which control is desired. For example, the control signals to the actuator may be determined with regard to the signals obtained from vibration sensors placed at or in that point. As another example, information from sensors or sources of vibration elsewhere in the structure may be used together with or instead of the signals from the first mentioned sensors, together with a knowledge of the vibration-communicating properties of the structure, to predict vibrations at said point or region and so to determine the control signals to be applied to the actuator in order to achieve the desired control. An automatic controller may be used to produce the control signals using information from said sensors or sources and from said knowledge of the properties of the structure, to achieve active control of vibration at said point or region.

BRIEF DESCRIPTION OF THE DRAWINGS

The invention will now be described, by way of example only, with reference to the accompanying drawings, in which:

FIGS. 1 and 2 illustrate an arrangement of actuators which may be used to realise the invention. Six uni-axial inertial actuators are attached to a substantially rigid flange 1 at their respective points of action 2 and 3. FIG. 1 shows the flange in side view, while FIG. 2 shows a face-on view.

In this example the flange 1 is a flat disc-shaped plate forming a small region of an extended mechanical structure (not shown), while the bodies of the actuators 4 and 5 are shown without additional inertial masses being attached.

Figure 1:
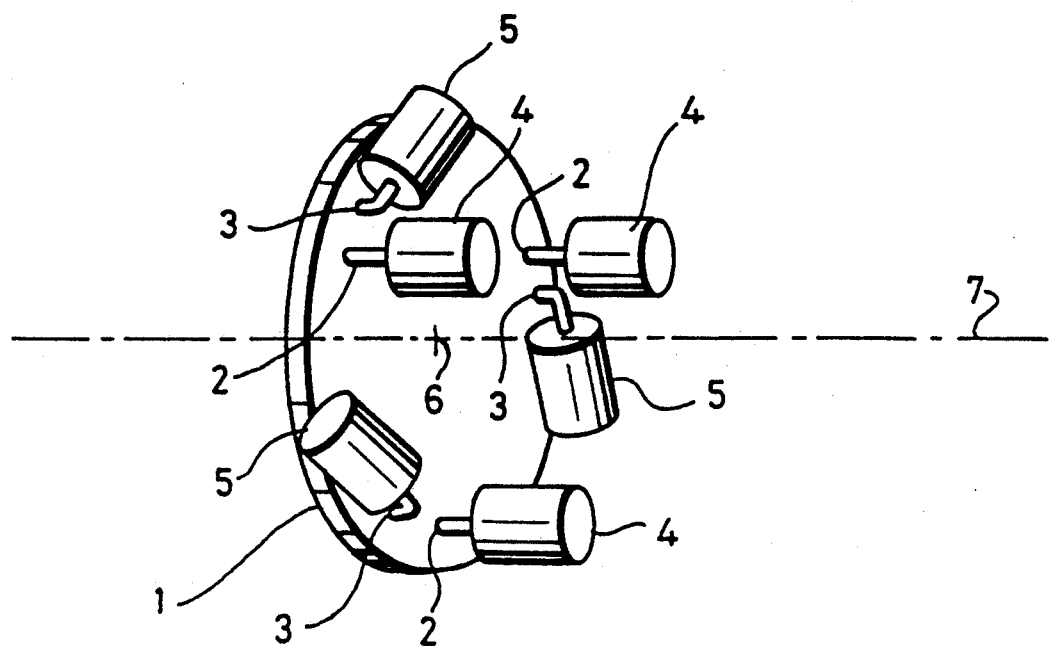
FIG. 1 is a perspective view of one arrangement of actuators.
Figure 2:
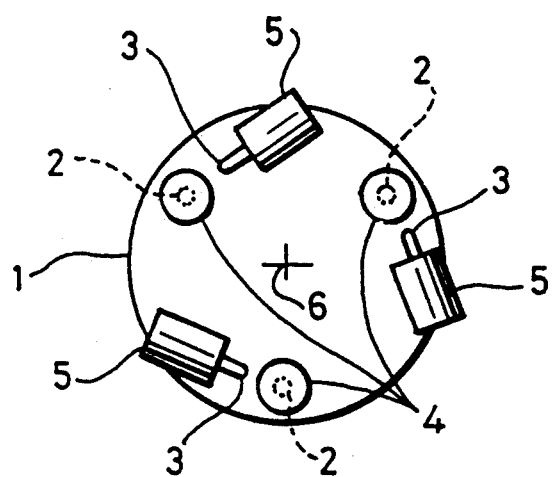
FIG. 2 is an end view looking along the axis of the arrangement.

The three actuators 4 are disposed parallel to one another, and their points of action 2 are distributed at equal angular spacings of 120° of arc about the centre 6 of the flange 1. The same is true of the points of action 3 but, as shown in FIG. 2, the points of action 3 are disposed at slightly different angles with respect to the points of action 2 to their left and right to allow for the disposition of the three remaining actuators 5, which are arranged tangentially of the flange 1. However, the points of action 2 and 3 of two actuators 4 and 5 may be coincident. The centre of the flange 1 is indicated at reference 6, and the axis 7 of the flange which passes through the centre 6 and is normal to the flange 1 is shown in FIG. 1. All six points of action lie at the same radius from the centre 6.

The axes of action of the parallel actuators 4 are parallel to the flange axis 7, and the actuators 4 acting in concert may thus provide either a single force on the flange 1 parallel to the axis 7, or a couple about any chosen axis which passes through centre 6 and is normal to axis 7, or any of these in combination. The axis of action of each of the remaining three tangential actuators 5 is normal to axis 7 and is tangential to the arc of an imaginary circle centred at 6 and passing through the actuators' points of action 3. The actuators 5 acting in concert may thus provide either a translational force parallel to any chosen axis normal to axis 7, or a couple about axis 7, or any of these in combination. The forces or couples produced will be determined by the control signals supplied to the uni-axial actuators.

In this manner, as above described, the six actuators 4, 5 are capable of controlling six degrees of motion of the flange 1.

Figure 3:
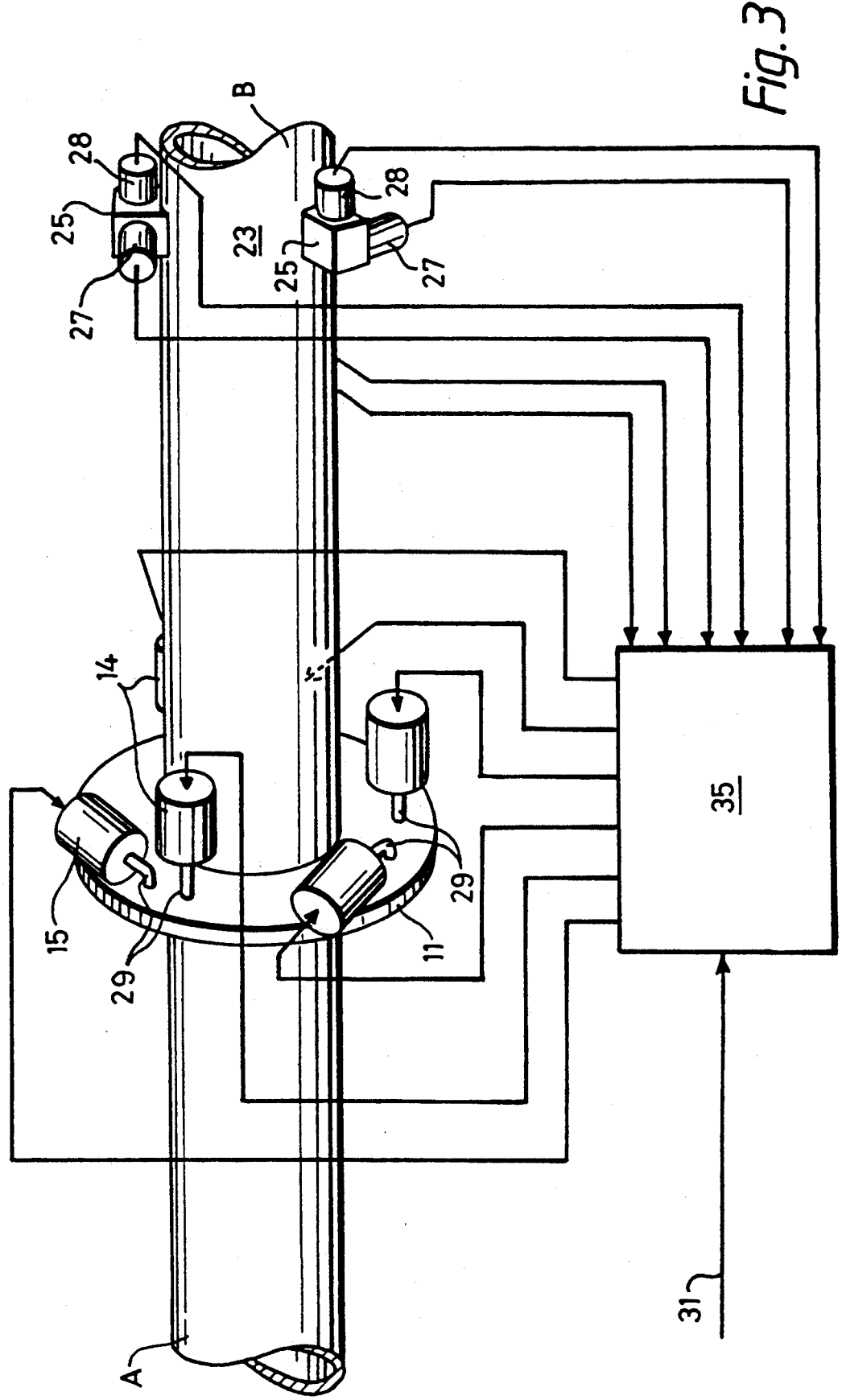
FIG. 3 is a perspective view of another arrangment similar to FIG. 1.
Figure 4:
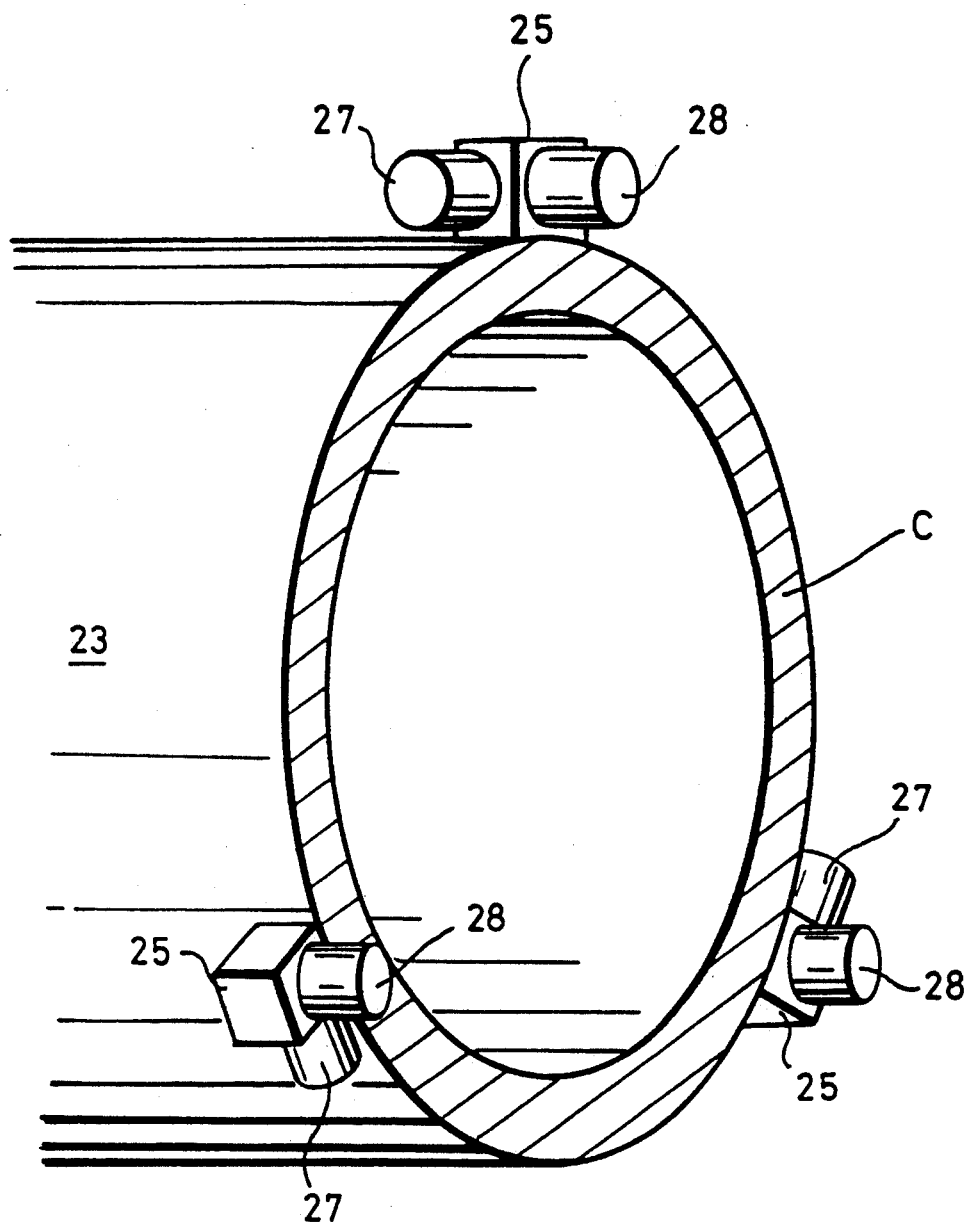
FIG. 4 is an enlarged view of the right hand end of the arrangement of FIG. 3.

Referring now to the other arrangement shown in FIGS. 3 and 4, an intermediate body 11 is attached as a flange welded around a tube or shaft 23, constituting an elongate member and connecting a source of periodic vibration at one end A to its other end B. In this case the elongate member is a cupro-nickel cooling water pipe 23 connected to a large marine diesel engine. Attached to the flange 1 are six actuators 14, 15, (described in greater detail below) which are controlled by an active control system in an arrangement illustrated in FIG. 3.

The control system comprises an electronic controller 35, which receives a signal 31 from a tachometer on the shaft of the diesel engine. In this case the control system is suitable for controlling vibrations of the pipe wall which do not produce significant distortions of the cross-section of the pipe. For any design of pipe there exists a "cut-on" frequency below which any vibrations which distort the cross-section will not be propagated. This is explained for example in the textbook by Junger and Feit entitled "Sound, Structures and their Interaction" (MIT Press, 1972). The presently disclosed control system is intended for use only at frequencies below this cut-on frequency.

The engine tachometer may for example be an optical device, such as the model R5000 shaft encoder supplied by Robbins & Meyers Inc of Goleta, California. The diesel engine and tachometer are not shown in the drawings.

In FIG. 3 the vibrations arrive from A, to the left of the pipe 23, and the actuators 14, 15 are each driven by the controller 35 in such a manner as to prevent the vibrations produced by the diesel engine from being communicated to the end B of the pipe 23 to the right of the actuators.

It is to be noted that in FIG. 3 one actuator 14 is partially obscured and one actuator is totally obscured by the pipe 23.

Vibrations to the right of the actuators are detected by a set of accelerometers 27, 28 attached to the pipe 23. Accelerometers are devices well known to those versed in the art of vibration control and may be obtained commercially, for example from Endevco Corp. of San Juan Capistrano, California.

A suitable arrangement of accelerometers 27, 28 is indicated in FIG. 4, which shows a cross-section C through the pipe 23 at the accelerometers. Three aluminium blocks 25 are attached rigidly to the circumference of the pipe 23 at approximately regular intervals, and with, one face in the plane of the section C. As suggested by the figure, the blocks are of appreciably smaller dimension than the cross-section of the pipe. Two accelerometers 27, 28 are attached to each block: one 27 with its base attached to a face parallel to the axis of the pipe 23, and another 28 with its base attached to a face in the plane of the cross-section. Following normal practice in the art of vibration measurement, the three blocks 25 are glued to the pipe 23, while the accelerometers are attached to them by means of threaded studs.

In FIG. 3 one block and two accelerometers are obscured by the pipe 23.

This arrangement allows six degrees of freedom of vibration of the section C to be observed by measuring the accelerometer outputs.

The flange 11 will not in practice be perfectly rigid. Consequently the action of the actuators 14, 15 may cause small distortions of the flange and hence of the pipe cross-section. This in turn may excite higher-order, non-propagating wave modes of the pipe whose amplitudes decay exponentially away from the flange 11 so that the least rapidly decaying of these wave modes decay sufficiently so as not to affect the accelerometers 27, 28. In most practical systems a distance of a few diameters of the pipe will suffice, provided the highest frequency to be controlled does not approach the cut-on frequency of any higher wave mode (ie a mode which distorts the pipe cross-section). However, it will normally be advisable to determine the required distance by calculation.

The six actuators 14, 15 comprise electrodynamic inertial shakers attached by rigid connecting rods 29 to the flange 11. The shakers are devices well known to those versed in the art of vibration analysis and control, and may be obtained commercially, for example from Ling Dynamic Systems Inc. of Yalesville, Connecticut. They consist of an electric coil suspended in a magnetic field provided by a permanet magnet which forms the body of the device. On passing a current through the coil, a force of reaction is produced between coil and magnet. A stud (not shown) is attached to the coil, to which the connecting rods 29 are to be attached. The connecting rods 29 and the flange 11 may be made of the same material as the pipe 23 so that these may conveniently be joined by welding. This is preferred to threaded connections because of a more predictable response to vibration. Thus the controller 35 causes the actuators 14, 15 to produce forces on the flange 11 by providing electric currents to them.

When alternating currents are provided to the actuators by the controller 35, they provide alternating forces to the flange 11 which in turn produce vibrations in the pipe 23. It is apparent, therefore, that by producing vibrations in the pipe at the section C which precisely oppose the vibrations produced at the same place by the diesel engine, the control system brings the pipe 23 at this section to rest. In a real mechanical system this will necessarily imply that the amplitude of vibrations has been reduced to zero everywhere along the pipe 23 to the right of the flange 11.

Suitable designs for the electronic controller 35 are well known in technical literature: for example, see Elliott, S J, et al, 1987, "A Multiple-Error LMS Algorithm and its Application to the Active Control of Sound and Vibration" (IEE Trans. ASSP, 35 No. 10, pp1423–1434). The preferred device for the present embodiment is the TX6000 controller manufactured by Topexpress Ltd of Cambridge, UK.

I claim:

1. A system for actively controlling vibration in a structure having an axis subject to unwanted vibrations, comprising:
   a body extending along said axis and subject to said vibrations;
   an intermediate member mounted on to said body and extending radially outwardly from said axis;
   a plurality of uni-axial inertial actuators each for producing an action in a respective single direction, said actuators being mounted solely on said intermediate member, and said actuators being configured to act upon said intermediate member in respective directions disposed tangentially of said axis;
   sensor means coupled to said structure for detecting unwanted vibrations; and
   control means responsive to said sensor means for driving said actuators whereby cancelling vibrations are applied by said actuators to said structure in directions tangential to said axis for cancelling said unwanted vibrations in the structure.

2. A system according to claim 1 wherein said body has a cylindrical periphery and said intermediate member comprises a flange mounted on the body.

3. A system according to claim 1 wherein the sensor means comprises an accelerometer.

4. A system according to claim 3 wherein the sensor means comprises first and second accelerometers disposed perpendicular to each other.

5. In a system for actively controlling vibration on a structure having an axis subject to unwanted vibrations, comprising:
   a body extending on said axis and subjected to said unwanted vibrations;
   a flange mounted on the body so as to extend radially outwardly of said axis;
   a plurality of electrically driven un-axial inertial actuators each for producing an action in a respective single direction for applying to the flange cancelling vibrations for cancelling the unwanted vibrations in the body, said actuators being driven to produce said cancelling vibrations in response to vibrations sensed from said body;
   the improvement comprising that the actuators each produce an action along a respective line disposed tangentially of a circle centered on said axis, and the actuators are mounted solely on the flange whereby to produce said cancelling vibrations so as to cancel said unwanted vibrations in the body.

* * * * *